(12) United States Patent
Yoo et al.

(10) Patent No.: US 10,476,079 B2
(45) Date of Patent: *Nov. 12, 2019

(54) LITHIUM SECONDARY BATTERY

(71) Applicant: SK INNOVATION CO., LTD., Seoul (KR)

(72) Inventors: Kyung-Bin Yoo, Daejeon (KR);
Duck-Chul Hwang, Gyeonggi-do (KR);
Jin-Sub Lim, Daejeon (KR);
Kook-Hyun Han, Daejeon (KR)

(73) Assignee: SK Innovation Co., Ltd., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 14/947,654

(22) Filed: Nov. 20, 2015

(65) Prior Publication Data
US 2016/0149210 A1    May 26, 2016

(30) Foreign Application Priority Data
Nov. 21, 2014   (KR) .................... 10-2014-0163524

(51) Int. Cl.
*H01M 4/525*     (2010.01)
*H01M 4/36*      (2006.01)
*H01M 10/052*    (2010.01)

(52) U.S. Cl.
CPC .......... *H01M 4/525* (2013.01); *H01M 4/366* (2013.01); *H01M 10/052* (2013.01)

(58) Field of Classification Search
CPC ...... H01M 4/131; H01M 4/485; H01M 4/505; H01M 4/525; H01M 4/1391; H01M 10/052; H01M 10/0525
See application file for complete search history.

(56) References Cited

U.S. PATENT DOCUMENTS

| 2009/0068561 | A1* | 3/2009 | Sun ....................... | H01M 4/131 429/223 |
| 2013/0260231 | A1* | 10/2013 | Hua ...................... | H01M 4/364 429/211 |
| 2014/0027670 | A1* | 1/2014 | Sun ....................... | H01M 4/483 252/182.1 |
| 2014/0087266 | A1* | 3/2014 | Li ......................... | H01M 4/485 429/231.3 |
| 2014/0158932 | A1* | 6/2014 | Sun ....................... | H01M 4/13 252/182.1 |

FOREIGN PATENT DOCUMENTS

| WO | WO-2012093797 A2 * | 7/2012 | ............ H01M 4/364 |
| WO | WO 2013183974 A1 * | 12/2013 | ............. H01M 4/13 |

* cited by examiner

*Primary Examiner* — Jimmy Vo
(74) *Attorney, Agent, or Firm* — IP & T Group LLP

(57) ABSTRACT

A lithium secondary battery comprises a cathode, an anode and a non-aqueous electrolyte. The cathode includes a cathode active material containing lithium-metal oxide of which at least one of metals has a continuous concentration gradient from a core part to a surface part thereof, and is doped with transitional metal. The lithium-metal oxide includes elements M1, M2 and M3. One of M1, M2 and M3 has a concentration gradient range in which a concentration increases from the core part to the surface part.

13 Claims, 1 Drawing Sheet

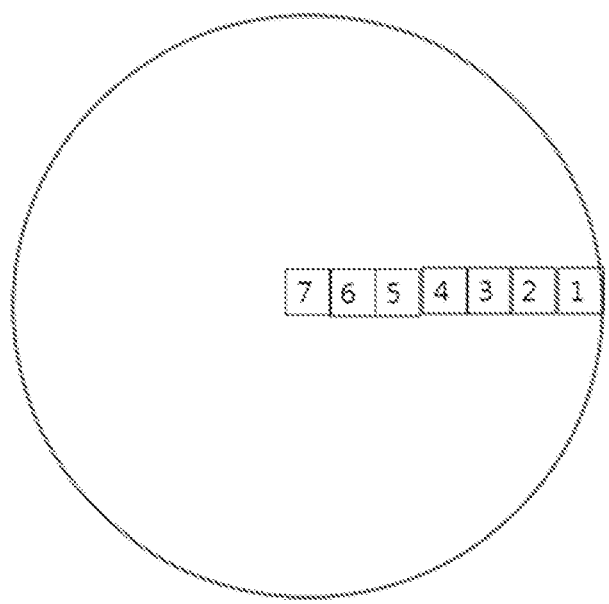

LITHIUM SECONDARY BATTERY

CROSS-REFERENCE TO RELATED APPLICATION

This application claims priority to and the benefit of Korean Patent Application No. 10-2014-0163524, filed on Nov. 21, 2014, the disclosure of which is incorporated herein by reference in its entirety.

BACKGROUND OF THE INVENTION

1. Field of the Invention

The present invention relates to a lithium secondary battery, and more specifically, to a lithium secondary battery with excellent low temperature properties.

2. Description of the Related Art

With rapid progress of electronic, telecommunication and computer industries, portable electronic communication devices such as a camcorder, mobile phone, notebook PC, etc. have been remarkably developed. Accordingly, the demand for a lithium secondary battery as a power source capable of driving the above device is also increased. In particular, with regard to applications of eco-friendly power sources such as an electric car, uninterruptible power supply, electromotive tool and satellite, research and development have been actively proceeded in domestic field and other countries such as Japan, Europe, United States, etc.

Among currently used secondary batteries, the lithium secondary battery developed since early 1990's includes an anode made of a carbon material capable of absorbing and desorbing lithium ions, a cathode made of lithium-containing oxide, and a non-aqueous electrolyte containing lithium salt dissolved in a mixed organic solvent in a suitable amount.

In this regard, as the application of the lithium secondary battery is more enlarged, it is often used as a power source of an electrical vehicle, or the like. In such a case, it is necessary for the lithium secondary battery used in the electrical vehicle to exhibit a performance capable of being operated under severer environments such as hot or low temperature environments than the mobile phone, notebook PC, etc. The vehicle should be operated at a low temperature such as winter, and therefore typically, excellent charge/discharge performances, and output properties at a low temperature may be required in the lithium secondary battery.

However, the power and charge/discharge performances are severely reduced under a low temperature due to a decrease in an electrochemical reaction rate, such that the demand for a lithium secondary battery having excellent low temperature properties has been increased.

Korean Patent Laid-Open Publication No. 2004-11851.7 discloses a non-aqueous electrolyte additive for a lithium secondary battery.

SUMMARY OF THE INVENTION

Accordingly, it is an object of the present invention to provide a lithium secondary battery with significantly improved low temperature properties.

The above object of the present invention will be achieved by the following characteristics:

(1) A lithium secondary battery, including a cathode, an anode and a non-aqueous electrolyte, wherein the cathode includes a cathode active material containing lithium-metal oxide of which at least one of metals has a continuous concentration gradient from a core part to a surface part thereof, and is doped with transitional metal.

(2) The lithium secondary battery according to the above (1), wherein the transitional metal is at least one selected from a group consisting of Ti, Zr, Mg, Al, V, B, Na, Ca, Cr, Cu, Zn, Ge, Sr, Ba, Nb and Ga.

(3) The lithium secondary battery according to the above (1), wherein the transitional metal is doped in a concentration of 500 to 7,000 ppm.

(4) The lithium secondary battery according to the above (1), wherein the transitional metal is doped in a concentration of 500 to 3,000 ppm.

(5) The lithium secondary battery according to the above (1), wherein the lithium-metal oxide further includes a coating layer on a surface, which is made of Al, Ti, Ba, Zr, Si, B, Mg and P, and alloys or oxides thereof.

(6) The lithium secondary battery according to the above (1), wherein another of the metals included in the lithium-metal oxide has a constant concentration from the core part to the surface part.

(7) The lithium secondary battery according to the above (1), wherein the lithium-metal oxide includes a first metal having a concentration gradient region with increased concentration from the core part to the surface part, and a second metal having a concentration gradient region with decreased concentration from the core part to the surface part.

(8) The lithium secondary battery according to the above (1), wherein the lithium-metal oxide is represented by Formula 1 below, wherein at least one of M1, M2 and M3 has a continuous concentration gradient from the core part to the surface part:

  [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B, and $0<x\le1.1$, $2\le y\le 2.02$, $0\le a\le1$, $0\le b\le1$, $0\le c\le1$, and $0<a+b+c\le1$).

(9) The lithium secondary battery according to the above (8), wherein at least one of the M1, M2 and M3 has a concentration gradient region with increased concentration from the core part to the surface part, while the others have a concentration gradient region with decreased concentration from the core part to the surface part.

(10) The lithium secondary battery according to the above (8), wherein at least one of the M1, M2 and M3 has a concentration gradient region with increased concentration from the core part to the surface part, another has a concentration gradient region with decreased concentration from the core part to the surface part, and the other has a constant concentration from the core part to the surface part.

(11) The lithium secondary battery according to the above (8), wherein the M1, M2 and M3 are Ni, Co and Mn, respectively.

(12) The lithium secondary battery according to the above (8), wherein the M1 is Ni, and $0.6\le a\le 0.95$ and $0.05\le b+c\le 0.4$.

(13) The lithium secondary battery according to the above (8), wherein the M1 is Ni, and $0.7\le a\le 0.9$ and $0.1\le b+c\le 0.3$.

(14) The lithium secondary battery according to the above (1), wherein the lithium-metal oxide has a first particle of a rod-type shape.

The lithium secondary battery of the present invention includes the cathode active material having a continuous concentration gradient and containing lithium-metal oxide doped with the transitional metal, such that it is possible to achieve significantly improved effects in the low temperature properties. In more detail, the charge/discharge capacities and the power are significantly increased, and thereby it is possible to exhibit excellent performance under low temperature environments.

BRIEF DESCRIPTION OF THE DRAWINGS

The above and other objects, features and other advantages of the present invention will be more clearly understood from the following detailed description taken in conjunction with the accompanying drawing, in which:

FIG. 1 is a view schematically illustrating a site of measuring a concentration of metal elements included in lithium-metal oxide according to an embodiment of the present invention.

DETAILED DESCRIPTION OF THE INVENTION

The present invention discloses a lithium secondary battery, including a cathode, an anode and a non-aqueous electrolyte, wherein the cathode includes a cathode active material containing lithium-metal oxide of which at least one of metals has a continuous concentration gradient from a core part to a surface part thereof, and is doped with transitional metal, such that the charge/discharge capacities and the power are significantly increased, and thereby it is possible to exhibit excellent performance under low temperature environments.

Hereinafter, exemplary embodiments of the present invention will be described in detail with reference to the accompanying drawings.

Cathode Active Material

The cathode active material according to the present invention includes lithium-metal oxide of which at least one of metals has a concentration gradient from a core part to a surface part thereof. Such a cathode active material exhibits superior life-span property, compared to a cathode active material without a change in concentration.

In the present invention, the fact that the metal of the lithium-metal oxide has a continuous concentration gradient from the core part to the surface part, means that other metals except for lithium may have a concentration distribution varying in a constant tendency from a core part to a surface part of a lithium-metal oxide particle. The constant tendency means that an entire development of change in concentration is decreased or increased, however, does not exclude that a value opposed to the above tendency may be represent at a position.

In the present invention, the core part of the particle means an area within 0.2 μm radius from a center of the active material particle, while the surface part means an area within 0.2 μm from the outmost portion of the particle.

The cathode active material according to the present invention may include at least one of metals having a concentration gradient. Therefore, as one embodiment, the cathode active material may include a first metal having a concentration gradient region with increased concentration from the core part to the surface part, and a second metal having a concentration gradient region with decreased concentration from the core part to the surface part. The first metal or second metal may be independently at least one of metals.

As another embodiment of the present invention, the cathode active material according to the present invention may include a metal having a constant concentration from the core part to the surface part.

A specific example of the cathode active material according to the present invention may include lithium-metal oxide represented by Formula 1 below, wherein at least one of M1, M2 and M3 has a continuous concentration gradient from the core part to the surface part:

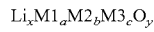 [Formula 1]

(wherein M1, M2 and M3 are selected from a group consisting of Ni, Co, Mn, Na, Mg, Ca, Ti, V, Cr, Cu, Zn, Ge, Sr, Ag, Ba, Zr, Nb, Mo, Al, Ga and B; and
0<x≤1.1, 2≤y≤2.02, 0≤a≤1, 0≤b≤1, 0≤c≤1, and 0<a+b+c≤1).

According to one embodiment of the present invention, at least one of M1, M2 and M3 may have a concentration gradient region with increased concentration from the core part to the surface part, while the others may have a concentration gradient region with decreased concentration from the core part to the surface part.

According to another embodiment of the present invention, at least one of M1, M2 and M3 may have a concentration gradient region with increased concentration from the core part to the surface part, another may have a concentration gradient region with decreased concentration from the core part to the surface part, and the other may have a constant concentration from the core part to the surface part.

According to a specific example of the present invention, M1, M2 and M3 may be Ni, Co and Mn, respectively.

The lithium-metal oxide according to the present invention may have a relatively higher content of Ni. Using Ni may be helpful for improving a capacity of the battery. For a structure of the conventional cathode active material, if a content of Ni is high, life-span is reduced. However, in a case of the cathode active material according to the present invention, the life-span property is not deteriorated even if it has a high content of Ni. Therefore, the cathode active material of the present invention may express excellent life-span property while maintaining a high capacity.

For example, with regard to the lithium-metal oxide according to the present invention, a molar ratio of nickel may range from 0.6 to 0.9, and preferably, 0.7 to 0.9. That is, if M1 is Ni in the above Formula 1, it may be 0.6≤a≤0.95 and 0.05≤b+c≤0.4, and preferably, 0.7≤a≤0.9 and 0.1≤b+c≤0.3.

A particle shape of the lithium-metal oxide according to the present invention is not particularly limited, but a first particle thereof preferably has a rod-type shape.

A particle size of the lithium-metal oxide according to the present invention is not particularly limited, and may be a range of 3 to 20 μm, for example.

In addition, the lithium-metal oxide is doped with transitional metal.

The lithium secondary battery of the present invention includes the lithium-metal oxide as the cathode active material, and as described above, the metal of the lithium-metal oxide has a continuous concentration gradient from the core part to the surface part, as well as, is doped with the transitional metal, and thereby expressing a significantly improved low temperature properties.

The transitional metal may be, for example, at least one selected from a group consisting of Ti, Zr, Mg, Al, V, B, Na, Ca, Cr, Cu, Zn, Ge, Sr, Ba, Nb and Ga.

A doping amount of the transitional metal is not limited, and for example, the transitional metal is doped in a concentration of 500 to 7,000 ppm. If the concentration thereof is less than 500 ppm, effects of improving the low temperature properties may be insignificant, and if the concentration thereof exceeds the 7,000 ppm, similarly, the effects of improving the low temperature properties may be decreased. In terms of maximizing the effects of improving the low temperature properties, preferably, the transitional metal is doped in a concentration of 500 to 3,000 ppm.

As necessary, the cathode active material according to the present invention may further include a coating layer on the above-described lithium-metal oxide. The coating layer may be made of a metal or metal oxide including, for example, Al, Ti, Ba, Zr, Si, B, Mg and P, and alloys thereof or oxides of the above metal.

The lithium-metal oxide according to the present invention may be prepared by co-precipitation.

Hereinafter, a method for preparing a cathode active material according to one embodiment of the present invention will be described.

First, a metal precursor solution having concentrations different from each other is prepared. The metal precursor solution is a solution including a precursor of at least one metal to be contained in the cathode active material. Typically, the metal precursor may include halides, hydroxides, acid salts of the metal, or the like.

To prepare the metal precursor solution, two metal precursor solutions of a metal precursor solution having a concentration of a composition for forming the core part of the cathode active material to be prepared, and a metal precursor solution having a concentration corresponding to the composition for forming the surface part are respectively obtained. For example, when preparing a metal oxide-containing cathode active material including nickel, manganese, and cobalt other than lithium, a precursor solution having a concentration of the nickel, manganese, and cobalt corresponding to the composition for forming the core part of the cathode active material, and a precursor solution having a concentration of the nickel, manganese, and cobalt corresponding to the composition for forming the surface part are prepared.

Next, a precipitate is formed while two metal precursor solutions are mixed with each other, and a transitional metal solution to be doped is mixed together during mixing. The transitional metal solution may be a sulfate solution of the transitional metal, but it is not limited thereto.

When mixing the solutions, a mixing ratio of the metal precursor solution may be continuously changed so as to correspond to the concentration gradient within a desired active material. Accordingly, in the precipitate, the concentration of the metal is controlled so as to have a concentration gradient within the active material. The precipitation may be carried out by adding a chelating agent and base during the mixing.

After the prepared precipitate is subjected to heat treatment, if it is mixed with a lithium salt and the mixture is again subjected to heat treatment, a cathode active material according to the present invention may be obtained.

Anode Active Material

The anode active material according to the present invention may include any material known in the related art, so long as it can absorb and desorb lithium ions, without particular limitation thereof. For example, carbon materials such as crystalline carbon, amorphous carbon, carbon composite, carbon fiber, etc., lithium metal, alloys of lithium and other elements, silicon, or tin may be used.

Such amorphous carbon may include, for example, hard carbon, cokes, mesocarbon microbead (MCMB) calcined at a temperature of 1500° C. or less, mesophase pitch-based carbon fiber (MPCF), or the like.

The crystalline carbon may include graphite materials, and specifically, natural graphite, graphite cokes, graphite MCMB, graphite MPCF, or the like. Other elements used together with lithium to form an alloy thereof may include, for example, aluminum, zinc, bismuth, cadmium, antimony, silicone, lead, tin, gallium or indium.

A size of the graphite used in the present invention is not particularly limited, but the graphite may have an average diameter in a range of 5 to 30 μm.

Secondary Battery

The present invention provides a lithium secondary battery fabricated using the above-described cathode active material, and the above-described anode active material according to the present invention.

The lithium secondary battery according to the present invention may be fabricated by including a cathode, an anode, and a non-aqueous electrolyte.

The cathode and anode may be formed by adding a solvent and, optionally, a binder, conductive material, dispersant, etc. to the cathode and anode active materials, and agitating the same to prepare mixtures of the cathode and anode active materials, respectively, then applying (coating) the prepared mixtures to a collector made of a metal material, and drying and pressing the same.

The binder may include any one commonly used in the related art without particular limitation thereof. For example, an organic binder such as vinylidene fluoride-hexafluoropropylene copolymer (PVDF-co-HFP), polyvinylidene fluoride (PVDF), polyacrylonitrile, polymethyl methacrylate, etc.; or an aqueous binder such as styrene-butadiene rubber (SBR), etc., may be used together with a thickener such as carboxymethyl cellulose (CMC).

The conductive material may include any conductive carbon substance generally used in the related art without particular limitation thereof.

The collector made of a metal material is a metal having high conductivity and being easily attached with the mixture of the cathode or anode active material. The metal used herein may include any one if it does not have reactivity in the voltage range of the battery. A non-limited example of the cathode active material may include a foil made of aluminum, nickel, or a combination thereof. A non-limited example of the anode active material may include a foil made of copper, gold, nickel or a copper alloy, or a combination thereof.

A separator may be present between the cathode and the anode. Such a separator may be made of a conventional porous polymer film typically used as a separator in the related art, for example, a porous polymer film made of a polyolefin polymer such as ethylene homopolymer, propylene homopolymer, ethylene/butene copolymer, ethylene/hexene copolymer or ethylene/methacrylate copolymer, which may be used alone or as a laminate formed by stacking up the same. Otherwise, typical porous woven fabrics, for example, a woven fabric made of high-melting point glass fiber, polyethylene terephthalate fiber, etc., may be used, but it is not particularly limited thereto. The separator may be applied to a battery by any general method such as winding. Besides, lamination (stacking) and folding of the separator and the electrode may also be used.

The non-aqueous electrolyte includes a lithium salt and an organic solvent, and the lithium salt may include any one typically used for the lithium secondary battery electrolyte without particular limitation thereof. The organic solvent may typically include any one selected from a group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxyethane, diethoxyethane, vinylene carbonate, sulforane, γ-butyrolactone, propylene sulfite, and tetrahydrofurane, or a mixture of two or more thereof.

The non-aqueous electrolyte for a lithium secondary may be introduced into an electrode structure including a cathode, an anode, and a separator installed between the cathode and the anode, so as to fabricate a lithium secondary battery. An appearance of the lithium secondary battery of the present invention is not particularly limited, but may include, for example, a cylindrical or square form using a can, a pouch type or a coin type.

Hereinafter, preferred embodiments are proposed to more concretely describe the present invention.

Example 1

<Cathode>

Lithium-metal oxide (hereinafter, FCG) with a whole composition of $LiNi_{0.80}Co_{0.10}Mn_{0.1}O_2$, which has a concentration gradient from a core part composition of $LiNi_{0.84}Co_{0.11}Mn_{0.05}O_2$ to a surface part composition of $LiNi_{0.78}Co_{0.10}Mn_{0.12}O_2$, and is doped with Ti was used as a cathode active material. The FCG, Denka Black as a conductive material, and PVDF as a binder were used in a weight ratio of 92:5:3, respectively, to prepare a cathode mixture, thereafter, the prepared mixture was applied to an aluminum substrate to coat the same, followed by drying and pressing to prepare a cathode.

For reference, the concentration gradient of the lithium-metal oxide used herein is listed in Table 1, and a measurement site of concentration is shown in FIG. 1. For the lithium-metal oxide particle with a distance from a core of a particle to the surface thereof, that is, 5 μm, the measurement sites were present at an interval of 5/7 μm from the surface.

TABLE 1

| Site | Ni | Mn | Co |
|---|---|---|---|
| 1 | 77.97 | 11.96 | 10.07 |
| 2 | 80.98 | 9.29 | 9.73 |
| 3 | 82.68 | 7 | 10.32 |
| 4 | 82.6 | 7.4 | 10 |
| 5 | 82.55 | 7.07 | 10.37 |
| 6 | 83.24 | 5.9 | 10.86 |
| 7 | 84.33 | 4.84 | 10.83 |

<Anode>

An anode mixture including 93 wt. % of natural graphite (d002 3.358 Å) as an anode active material, 5 wt. % of a flake type conductive material, that is, KS6 as a conductive material, 1 wt. % of SBR as a binder, and 1 wt. % of CMC as a thickener was prepared, and the prepared mixture was applied to a copper substrate, followed by drying and pressing to prepare an anode.

<Battery>

By notching both of a cathode plate and an anode plate in a suitable size, respectively, laminating the same, and installing a separator (polyethylene with a thickness of 25 μm) between the cathode plate and the anode plate, a cell was fabricated. Tap parts of the cathode and the anode were welded, respectively.

A combination of the welded cathode/separator/anode was put into a pouch, followed by sealing three sides of the pouch except one side into which an electrolyte is injected. In this case, a portion having the gap is included in the sealing portion. After injecting the electrolyte through the remaining one side, the one side was also sealed, followed by impregnation for 12 hours or more. The electrolyte used herein was formed by preparing 1M $LiPF_6$ solution with a mixed solvent of EC/EMC/DEC (25/45/30; volume ratio), and adding 1 wt. % of vinylene carbonate (VC), 0.5 wt. % of 1,3-propene sultone (PRS), and 0.5 wt. % of lithium bis(oxalato)borate (LiBOB) thereto.

After then, pre-charging was conducted with a current (2.5 A) corresponding to 0.25 C for 36 minutes. After 1 hour, degassing then aging for 24 hours or more were conducted, followed by chemical charging-discharging (charge condition: CC-CV 0.2 C 4.2 V 0.05 C CUT-OFF; discharge condition: CC 0.2 C 2.5 V CUT-OFF). Thereafter, standard charging-discharging was conducted (charge condition: CC-CV 0.5 C 4.2 V 0.05 C CUT-OFF; discharge condition: CC 0.5 C 2.5 V CUT-OFF).

Examples 2 to 30

The same procedures as described in Example 1 were conducted to fabricate cells except that type and concentration of the transitional metal doped to the cathode active material were changed as shown in Table 2 below. Table 2 describes the type and concentration of the transitional metal used herein.

Comparative Example 1

The same procedures as described in Example 1 were conducted to fabricate a cell except that $LiNi_{0.8}Co_{0.1}Mn_{0.1}O_2$ (hereinafter, NCM811) with no transitional metal doped thereon was used as a cathode active material.

Comparative Examples 2 to 6

The same procedures as described in Comparative Example 1 were conducted to fabricate cells except for using the NCM811 doped with a transitional metal.

Table 2 describes the type and concentration of the transitional metal used herein.

Comparative Example 7

The same procedures as described in Example 1 were conducted to fabricate a cell except for using the FCG with no transitional metal doped thereon.

Experimental Example 1

1. Measurement of Low Temperature Properties (Capacity at −20° C. Compared to the Capacity at Room Temperature)

By comparing capacities of 0.5 C charging and 0.5 C discharging at −20° C. compared to room temperature using the cells fabricated in the examples and the comparative examples, the low temperature properties thereof were measured. The results thereof are shown in Table 2 below.

2. Measurement of Low Temperature Power Properties (Power at −20° C. Compared to the Power at Room Temperature)

Power properties were measured in a HPPC (Hybrid Pulse Power Characterization by FreedomCar Battery Test Manual) method using the cells fabricated in the examples and the comparative examples at −20° C. The results thereof are shown in Table 2 below.

TABLE 2

| Section | cathode active material | Doping material | Doping concentration (ppm) | Charge capacity at −20° C. (%) | Discharge capacity at −20° C. (%) | Discharge power at −20° C. (%) |
|---|---|---|---|---|---|---|
| Example 1 | FCG | Ti | 500 | 63 | 75 | 18 |
| Example 2 | FCG | Ti | 1000 | 65 | 78 | 20 |
| Example 3 | FCG | Ti | 3000 | 66 | 80 | 23 |
| Example 4 | FCG | Ti | 5000 | 65 | 78 | 20 |
| Example 5 | FCG | Ti | 7000 | 62 | 75 | 18 |
| Example 6 | FCG | Zr | 500 | 63 | 74 | 19 |
| Example 7 | FCG | Zr | 1000 | 66 | 79 | 22 |
| Example 8 | FCG | Zr | 3000 | 67 | 81 | 24 |
| Example 9 | FCG | Zr | 5000 | 66 | 79 | 21 |
| Example 10 | FCG | Zr | 7000 | 63 | 76 | 19 |
| Example 11 | FCG | Mg | 500 | 62 | 74 | 18 |
| Example 12 | FCG | Mg | 1000 | 65 | 78 | 20 |
| Example 13 | FCG | Mg | 3000 | 66 | 80 | 23 |
| Example 14 | FCG | Mg | 5000 | 65 | 78 | 21 |
| Example 15 | FCG | Mg | 7000 | 62 | 75 | 18 |
| Example 16 | FCG | Al | 500 | 64 | 75 | 19 |
| Example 17 | FCG | Al | 1000 | 67 | 80 | 21 |
| Example 18 | FCG | Al | 3000 | 68 | 82 | 24 |
| Example 19 | FCG | Al | 5000 | 67 | 80 | 22 |
| Example 20 | FCG | Al | 7000 | 64 | 77 | 19 |
| Example 21 | FCG | Ti/Zr | 500 | 63 | 75 | 19 |
| Example 22 | FCG | Ti/Zr | 1000 | 65 | 78 | 21 |
| Example 23 | FCG | Ti/Zr | 3000 | 66 | 80 | 24 |
| Example 24 | FCG | Ti/Zr | 5000 | 65 | 78 | 22 |
| Example 25 | FCG | Ti/Zr | 7000 | 63 | 75 | 19 |
| Example 26 | FCG | Ti/Al | 500 | 63 | 74 | 19 |
| Example 27 | FCG | Ti/Al | 1000 | 66 | 79 | 22 |
| Example 28 | FCG | Ti/Al | 3000 | 67 | 81 | 25 |
| Example 29 | FCG | Ti/Al | 5000 | 66 | 79 | 23 |
| Example 30 | FCG | Ti/Al | 7000 | 63 | 76 | 20 |
| Comparative Example 1 | NCM811 | — | — | 62 | 73 | 17 |
| Comparative Example 2 | NCM811 | Ti | 500 | 62 | 74 | 17 |
| Comparative Example 3 | NCM811 | Ti | 1000 | 63 | 74 | 18 |
| Comparative Example 4 | NCM811 | Ti | 3000 | 63 | 75 | 19 |
| Comparative Example 5 | NCM811 | Ti | 5000 | 62 | 74 | 18 |
| Comparative Example 6 | NCM811 | Ti | 7000 | 62 | 73 | 18 |
| Comparative Example 7 | FCG | — | — | 62 | 72 | 17 |

Referring to the above Table 2, it can be seen that the cells in the examples exhibit superior low temperature properties, compared to those in the comparative examples.

Specifically, it can be seen that the cells in Comparative Examples 1 to 6 show an increase in charge capacity about maximum 1%, in discharge capacity about maximum 2%, and in discharge power about maximum 2% due to being doped with the transitional metal.

However, as compared to Comparative Example 7, it can be seen that the cells in Examples 1 to 5 show an increase in charge capacity to maximum 4%, in discharge capacity to maximum 8%, and in discharge power to maximum 6% at −20° C. compared to room temperature due to being doped with the transitional metal, and thereby an improvement level of the low temperature properties is significantly increased due to a combination of the FCT and the transitional metal doped thereon.

Further, it can be seen that the improvement level of the low temperature properties depending on the doping amount of the transitional metal is increased from 500 ppm to 3,000 ppm to reach the highest level at 3,000 ppm, and the improvement level thereof is decreased in a range of 3,000 ppm or more but less than 7,000 ppm, in terms of the concentration of the doped transitional metal.

What is claimed is:
1. A lithium secondary battery, comprising a cathode, an anode and a non-aqueous electrolyte,
wherein the cathode includes a cathode active material consisting of one or more lithium-metal oxides containing Ni, Co, and Mn,
and wherein at least one of the lithium-metal oxides includes a compound represented by Formula 1 below which is doped with a dopant element,

$Li_xM1_aM2_bM3_cO_y$, <span style="float:right">Formula 1</span>

$0<x\le1.1$, $2\le y\le2.02$, $0<a<1$, $0<b<1$, $0<c<1$, and $0<a+b+c\le1$, wherein M3 is Mn and has a concentration gradient range in which a concentration increases continuously throughout the cathode active material from a center of the cathode active material to a surface of the cathode active material,
wherein M1 is Ni and has a concentration gradient range in which a concentration decreases continuously from the center of the cathode active material to the surface of the cathode active material,
wherein M2 is Co and has a constant concentration from the center of the cathode active material to the surface of the cathode active material, wherein the dopant element is in a concentration of 1,000 to 5,000 ppm relative to the compound of Formula 1 having the concentration gradient range, and wherein a of Formula 1 is 0.7797 or more throughout an entire region of the cathode active material.

2. The lithium secondary battery according to claim 1, wherein the dopant element is at least one selected from a group consisting of Ti, Zr, Mg, Al, V, B, Na, Ca, Cr, Cu, Zn, Ge, Sr, Ba, Nb and Ga.

3. The lithium secondary battery according to claim 1, wherein the dopant element is doped in a concentration of 1000 to 3,000 ppm.

4. The lithium secondary battery according to claim 1, wherein the at least one of the lithium-metal oxides further includes a coating layer on a surface thereof, which is made of Al, Ti, Ba, Zr, Si, B, Mg and P, and alloys or oxides thereof.

5. The lithium secondary battery according to claim 1, wherein the concentration of Ni is within a range from 0.7797 to 0.9 throughout the entire region of the cathode active material.

6. The lithium secondary battery according to claim 1, wherein the at least one of the one or more lithium-metal oxides has a first particle of a rod-type shape.

7. The lithium secondary battery according to claim 1, wherein the dopant element is doped in a concentration of 1000 to 3,000 ppm.

8. The lithium secondary battery according to claim 1, wherein the at least one of the lithium-metal oxides further includes a coating layer on a surface thereof, which is made of Al, Ti, Ba, Zr, Si, B, Mg and P, and alloys or oxides thereof.

9. A lithium secondary battery, comprising a cathode, an anode and a non-aqueous electrolyte, wherein the cathode includes a cathode active material consisting of one or more lithium-metal oxides containing Ni, Co, and Mn, and wherein, at least one of the lithium-metal oxides includes a compound represented by Formula 1 below which is doped with a dopant element,

Formula 1

$0 < x \leq 1.1$, $2 \leq y \leq 2.02$, $0 < a < 1$, $0 < b < 1$, $0 < c < 1$, and $0 < a+b+c \leq 1$, wherein M3 is Mn, and has a concentration gradient range in which a concentration increases continuously throughout the cathode active material frog a center of the cathode active material to a surface of the cathode active material, wherein M1 is Ni and has a concentration gradient range in which a concentration decreases continuously from the center of the cathode active material to the surface of the cathode active material, wherein M2 is Co and has a constant concentration from the center of the cathode active material to the surface of the cathode active material, and wherein the dopant element is in a concentration of 1,000 to 5,000 ppm relative to the compound of formula I having the concentration gradient range, wherein a capacity of 0.5 C charging at −20° C. is 65% or more of that at room temperature, and a capacity of 0.5 discharging at −20° C. is 78% or more of that at room temperature, and wherein a of Formula 1 is 0.7797 or more throughout an entire region of the cathode active material.

10. The lithium secondary, battery according to claim 9, wherein the dopant element is at least one selected from a group consisting of Ti, Zr, Mg, Al, V, B, Na, Ca, Cr, Cu, Zn, Ge, Sr, Ba, Nb and Ga.

11. The lithium secondary battery according to claim 9, wherein a discharge power at −20° C. is −20% or more of that at room temperature.

12. A lithium secondary battery, comprising a cathode, an anode and a non-aqueous electrolyte, the cathode including a cathode active material, wherein the cathode active material includes a lithium-metal oxide containing Ni, Co, and Mn, represented by Formula 1 below,

Formula 1

$0 < x \leq 1.1$, $2 \leq y \leq 2.02$, $0 < a < 1$, $0 < b < 1$, $0 < c < 1$, and $0 < a+b+c \leq 1$, wherein M3 is Mn and has a concentration gradient range in which a concentration increases continuously throughout the cathode active material from a center of the cathode active material to a surface of the cathode active material, wherein M1 is Ni and has a concentration gradient range in which a concentration decreases continuously from the center of the cathode active material to the surface of the cathode active material, wherein M2 is Co and has a constant concentration from the center of the cathode active material to the surface of the cathode active material, wherein the lithium-metal oxide includes a dopant element in a concentration of 1,000 to 5,000 ppm relative to the compound of Formula 1 having the concentration gradient range, wherein the concentration of Ni is 0.7 or more throughout an entire region of the cathode active material, wherein the cathode does not include a cathode active material containing a lithium-metal oxide having which has only one or two of the Ni, Co, or Mn, and wherein a of Formula 1 is 0.7797 or more throughout an entire region of the cathode active material.

13. The lithium secondary battery of claim 12, wherein the concentration of Ni is within a range of from 0.7797 to 0.9 throughout the entire region, of the cathode active material.

* * * * *